United States Patent [19]

Helderman

[11] 4,250,681
[45] Feb. 17, 1981

[54] REMOVABLE AND REUSABLE ANCHOR AND METHOD

[76] Inventor: James F. Helderman, 414 S. Maple St., Graham, N.C. 27253

[21] Appl. No.: 102,549

[22] Filed: Dec. 10, 1979

[51] Int. Cl.³ .............................................. E04B 1/38
[52] U.S. Cl. ...................................... 52/704; 405/259
[58] Field of Search .............. 52/698, 704, 707, 125; 405/259; 85/1 H

[56] References Cited

U.S. PATENT DOCUMENTS

| | | | |
|---|---|---|---|
| 1,504,336 | 8/1924 | Foster | 52/704 X |
| 1,570,439 | 1/1926 | Hogan | 52/698 |
| 2,691,293 | 10/1954 | Patterson | 52/698 X |
| 3,201,906 | 8/1965 | Giardina | 52/704 X |
| 3,863,975 | 2/1975 | Oldenettel | 52/704 X |
| 4,162,596 | 7/1979 | Damman | 52/704 X |

Primary Examiner—Carl D. Friedman
Attorney, Agent, or Firm—B. B. Olive

[57] ABSTRACT

A removable and reusable anchor suited for installation in concrete floors, roof decks, beams, precast panels and walls to anchor or support machinery, fixtures, and the like, comprises a metal rod having a lower angled, deformed portion, adapted to reside in an angled hole drilled in the concrete and an outer portion having its axis oriented perpendicular to the surface of the concrete and extending outwardly therefrom. Means are provided for stiffening and effecting resilient engagement of the lower portion in the angled hole. Various modifications for use of the anchor are disclosed.

13 Claims, 15 Drawing Figures

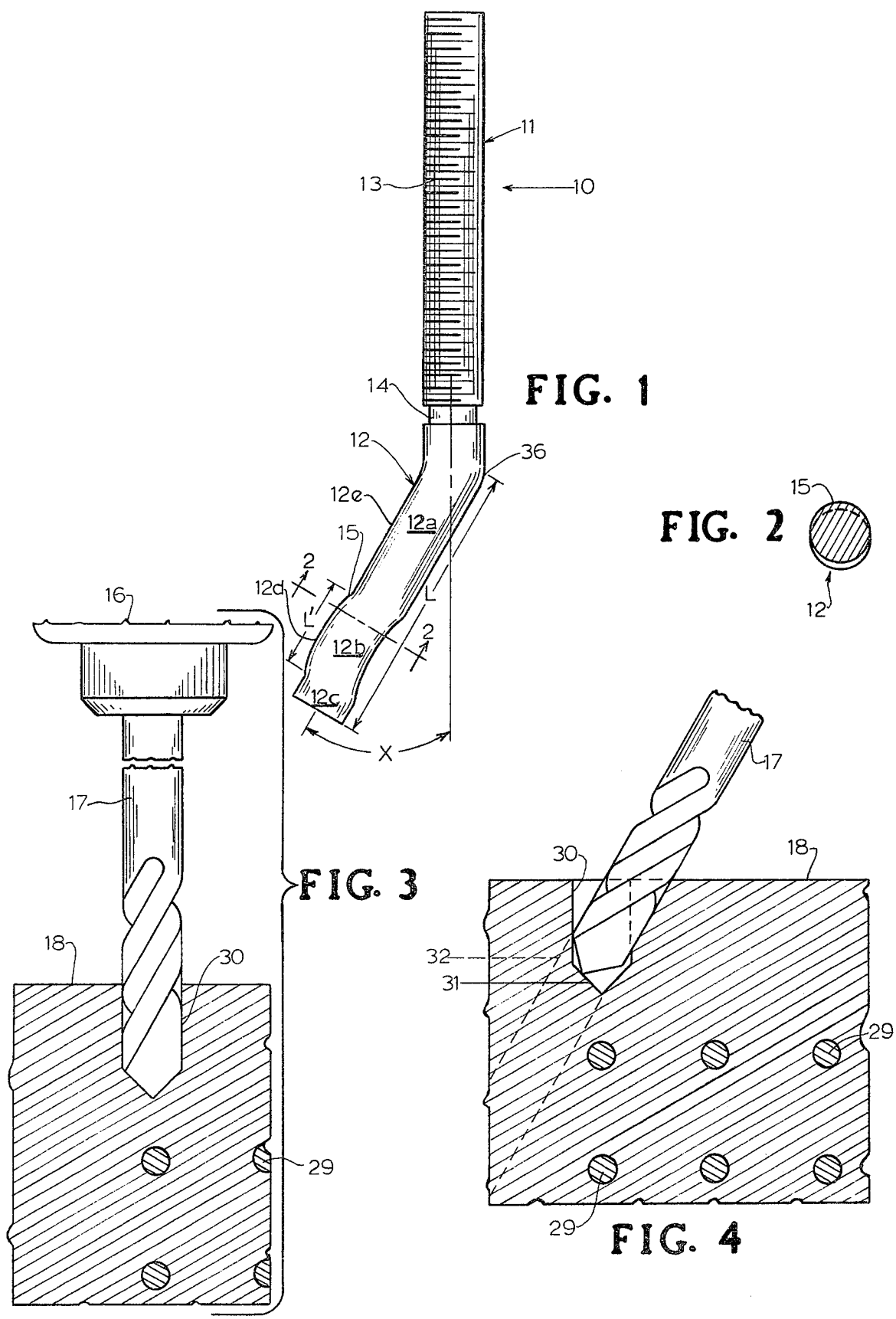

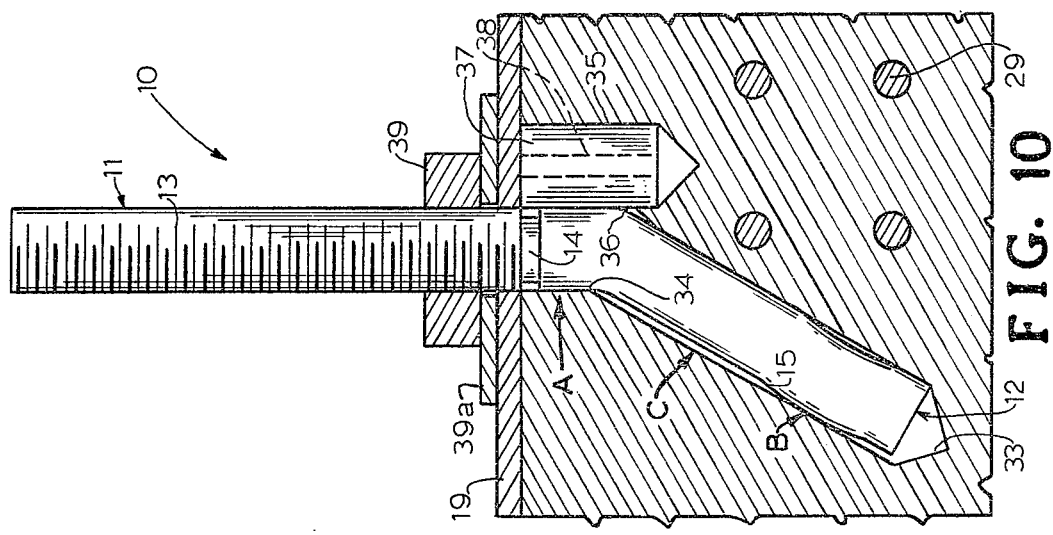
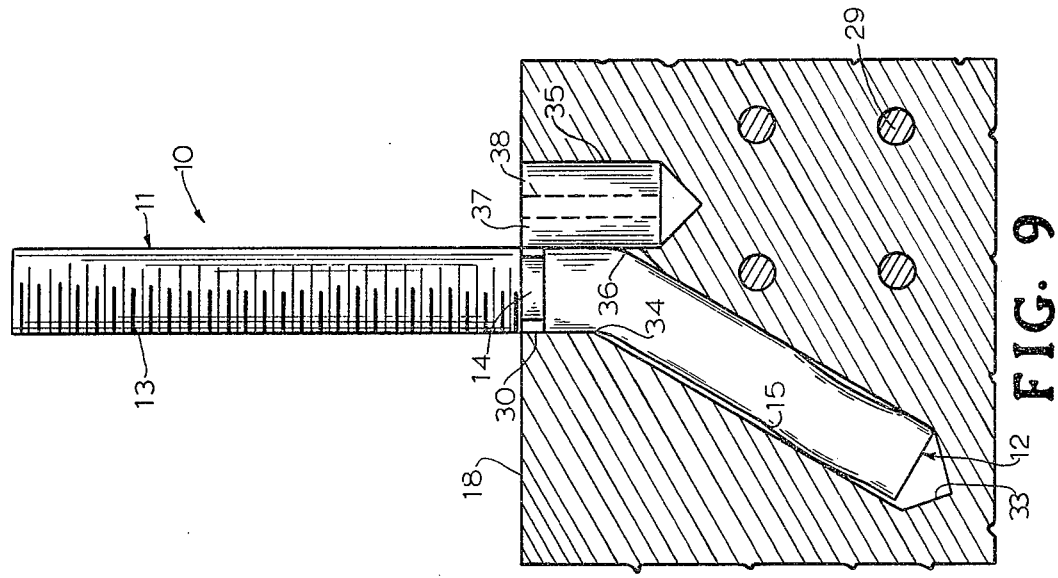
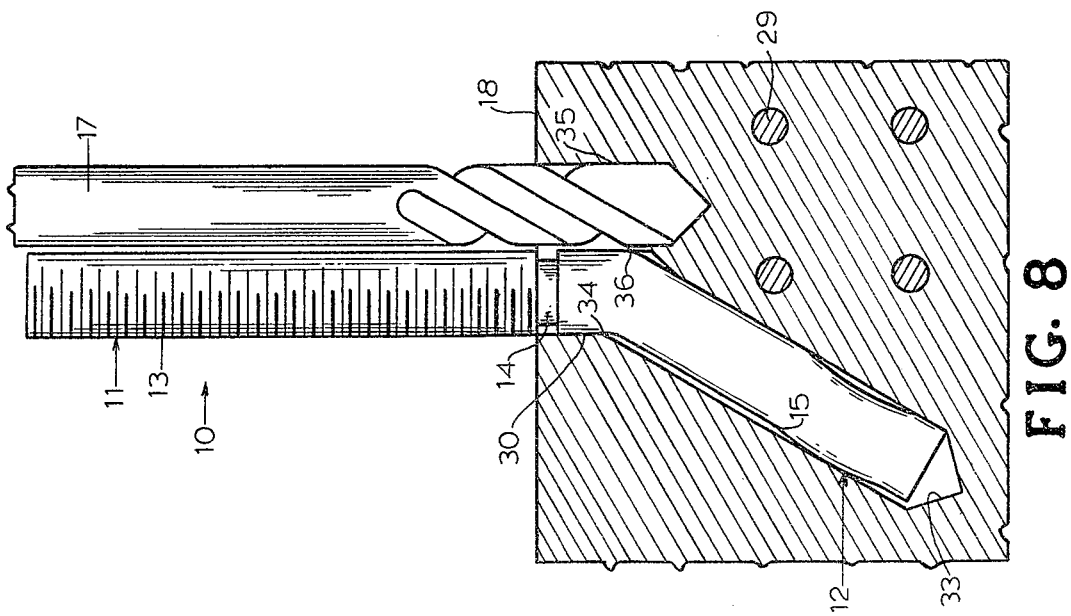

REMOVABLE AND REUSABLE ANCHOR AND METHOD

BACKGROUND OF THE INVENTION

1. Field of the Invention

This invention relates to anchoring devices and particularly to anchoring devices which are intended to be installed in concrete or other relatively hard material.

2. Description of the Prior Art

The installation of expandable anchors and toggle bolts in concrete floors, walls, roof decks, beams, precast panels, and the like, is well known in the art as a means for anchoring machinery, supporting fixtures, and the like.

U.S. Pat. No. 1,570,439 provides a so-called "seam" anchor bent end portion which is inserted into a hole formed in the joint between two bricks. A bearing block is used to wedge the anchor in the hole. This patent, however, provides no teaching for an anchor adapted for an angled hole.

U.S. Pat. No. 2,691,293 also illustrates an anchor with a curved lower end which is intended to be embedded in place in the concrete when poured. This anchor provides an exposed portion which is threaded for attachment of devices to be anchored. However, the anchor is not removable or reusable or adapted for installation in an angled hole or for use after the concrete is hardened or set.

Useful additional background information is found in a manual entitled "Anchor and Fastener Training Manual for the Building and Construction Trade" published in 1966 by the U.S. Expansion Bolt Company, York, Pa. 17405. However, none of the anchoring devices and anchoring techniques shown in this manual relate to a removable and reusable anchor adapted for installation in an angled hole.

Numerous problems and deficiencies are experienced with conventional anchors and their method of employment in predrilled holes. Conventional anchors are often difficult to seal. Consequently, exposure to water penetration into the hole followed by freezing and thawing often causes deterioration or crumbling of the concrete and may eventually cause the anchor to fail in service. Also, vibration is often associated with slow crumbling and abrading of the concrete by the conventional anchor. In this situation, the conventional anchor may begin to rotate in a hole enlarged by wobbly rotation and failure of the anchor may then occur. In the case of expansion-type anchors which are not properly sealed, the anchor and surrounding concrete sometimes fail and pull out because of a loose-fit in a deteriorated wall surrounding the hole in which the anchor is installed.

Another problem arises with conventional anchors when it is desired to locate an anchor in an exact location and such location interferes with a reinforcing rod, piping, or the like, embedded in the concrete at such location. Vertical drilling for placement of an anchor is impossible and the location must be changed.

From the foregoing, it can be seen that it would be desirable to have a removable and reusable anchor and a method of installing such an anchor based on using a hole angled in the concrete for receiving the secured portion of the anchor. Further, it would be desirable to overcome the deficiencies mentioned above with respect to conventional anchors. The anchor and method of the present invention is, thus, intended to overcome such deficiencies as its primary object. Other objects will appear as the description proceeds.

SUMMARY OF THE INVENTION

A removable and reusable anchor according to the invention is formed of an integral rod member with a bend intermediate its length so as to provide one portion adapted to be secured by clamping, by frictional securement or by a combination of the same in a hole having its axis angled with respect to the surface of the concrete at an angle substantially equal to the angle of the bend and an outwardly extending portion oriented perpendicular to the surface of the concrete and adapted for service as an anchoring device. A floor anchor application is used for illustration and the secured portion of the invention anchor is referred to as the lower end portion and the outwardly extending portion of the invention anchor is referred to as the upper end portion. Using this terminology, a portion of the lower angled end portion of the rod is deformed to provide increased holding power for the anchor, once installed and tightened as a clamp. In a preferred embodiment, the upper end portion of the anchor is threaded and a thread relief area is formed between the upper and lower end portions of the rod at the bend. Tightening of a nut mounted on the upper end portion acts to secure the lower end portion in the concrete by clamping action. A modification of the invention anchor is also illustrated which allows the use of a ring, hook, or the like, with the basic anchor construction of the invention.

The preferred method of installation as applied to a floor anchor, for example, involves drilling a shallow, vertical hole as a starting hole. Once this starting hole has been finished, another angled hole is drilled downwardly from the side wall or base of the starting hole to a depth corresponding to the length of the lower end of the anchor. A sealant is then applied to fill the holes. The lower end portion of the invention anchor is then inserted in the angled hole and the threaded upper end portion is brought to a vertical position. The sealant is thus extruded around the bolt between its lower end portion and the walls of the hole in which it is now inserted. Upon completion of this operation, another vertical hole is drilled adjacent the base of the threaded upper end and a resilient plug, e.g., nylon, is inserted for the purpose of absorbing vibration and also for the purpose of substantially eliminating any tendency for the concrete to crumble around the holes which were drilled to receive the anchor. The anchor is then further secured by appropriate tightening of a nut arrangement mounted on the threaded upper end portion of the anchor thereby effectively causing the lower end portion to be clamped against the concrete. In an alternative embodiment, the base of the upper end portion of the anchor rod is provided with an integral spur-type formation which is hammered into the concrete and, in many applications, may avoid the need for the mentioned resilient plug.

DESCRIPTION OF THE DRAWINGS

FIG. 1 is a side elevation view of the preferred embodiment of the anchor of the invention.

FIG. 2 is a cross section taken on line 2—2 of FIG. 1.

FIG. 3 is a fragmentary section view illustrating the first step of a floor anchor operation, i.e., drilling of a shallow vertical hole, in preparation for mounting the anchor of the invention.

FIG. 4 is a view similar to FIG. 3 but illustrating the beginning of an angled hole.

FIG. 8 illustrates the next step of drilling a plug hole adjacent the installed anchor device.

FIG. 9 is a view of the anchor and plug in place.

FIG. 10 is a view of the anchor and plug and a fragmentary view of a machinery base plate anchored according to the invention.

DESCRIPTION OF THE PREFERRED EMBODIMENT

Figure 7:
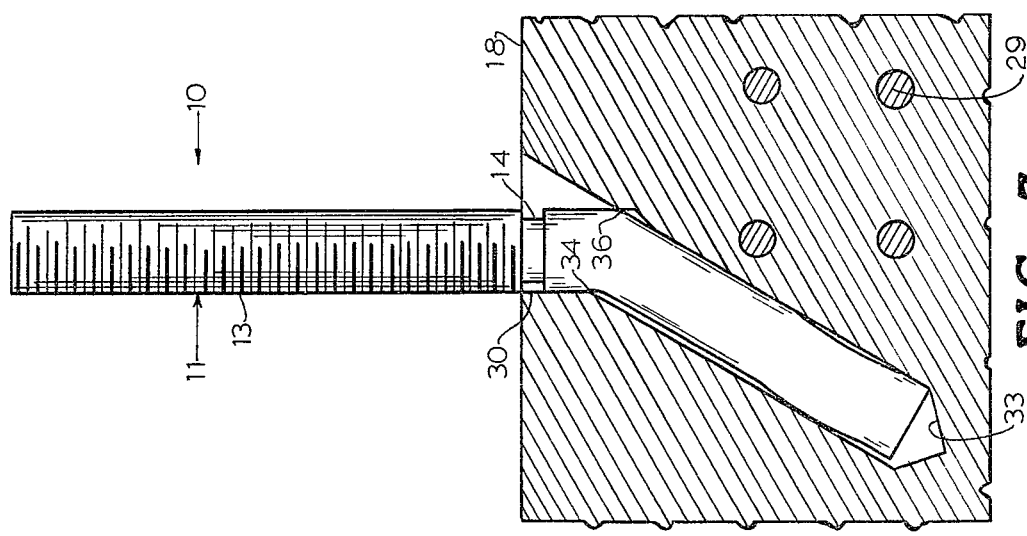
FIG. 7 is a view without a sealant and the anchor in place in the holes.

Referring first to FIGS. 1, 2, 7, 8, 9 and 10, anchor 10 is illustrated in a first embodiment. As shown, anchor 10 is formed from an integral round metal rod and includes an upper portion 11 and an angled lower portion 12. Any material of which such devices are commonly made, e.g., mild steel, heat treated alloy steel, stainless steel, brass or aluminum, may be used.

Anchor 10, in the first form, has a threaded portion 13 extending the length of the upper portion 11 or, if desired, for only a predetermined portion thereof. For example, the lower portion 12 is bent at an angle "X" of between 30 degrees to 45 degrees and the length "L" indicated in FIG. 1 is preferably equal to the length of four to seven rod diameters. It has been found that if angle X is less than 30 degrees, the proper clamping action is not obtained unless special care is taken in installation. Also, it has been found that if angle X is greater than 45 degrees there is no significant increase in the holding power. A deformed portion or bend 15 forms a misaligned portion 12b between major and minor portions 12a, 12c and extends for a length L' equivalent to about one-third of the distance L indicated in FIG. 1. Bend 15 provides a bearing surface 12d with reduced hole clearance as compared to the hole clearance of the inner wall 12d of lower portion 12. A thread relief 14 is provided between the upper and lower portions 11 and 12. Thread relief 14 is designed to extend to a level at or near the floor level when anchor 10 is installed. A nut or suitable locking device is tightened on portion 11 as seen in FIG. 10 which allows for the point of greatest stress to be transferred from point A where the concrete web is thinnest to point B where the concrete web is thicker and stronger.

Referring next to the method for installation of anchor 10, first a shallow hole 30 is drilled vertically to a depth of one and one-half to two times the rod diameter and extends into the concrete illustrated as a concrete floor slab 18 in FIG. 3. A conventional hand-held electric rotary or impact drill 16 and associated concrete drill bit 17 is used to drill hole 30. A useful practice, although not illustrated, is to employ the anchor plate of the machine as a template to exactly locate the initial hole thereby assuring an accurate layout and to avoid reinforcing rod 29.

Figure 6:
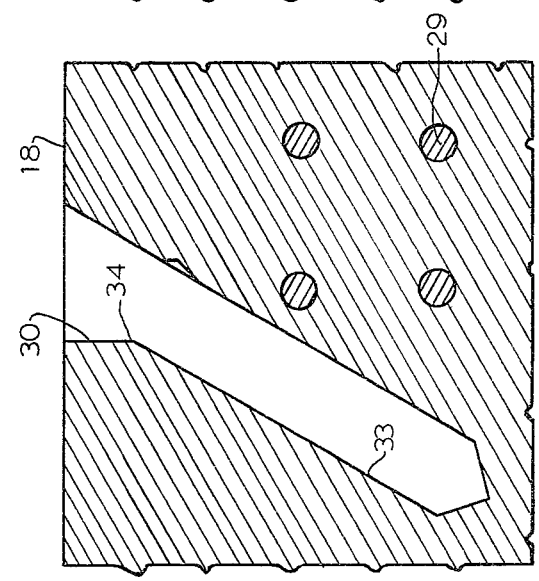
FIG. 6 is a view of the finished holes.
Figure 5:
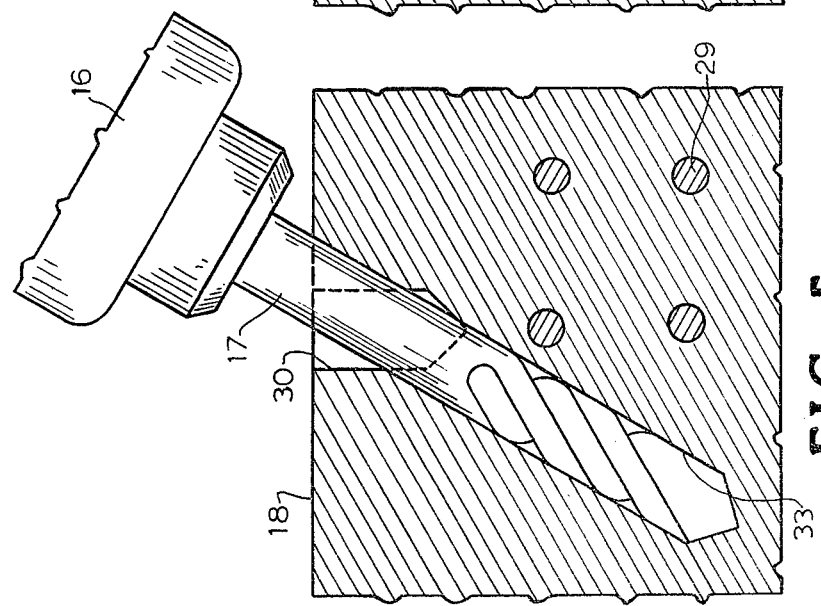
FIG. 5 is a view similar to that of FIG. 4 but illustrating the next step, i.e., drilling the angled hole.

Next, the tip of the drill bit is held against the wall 31 of hole 30, see FIG. 4, at the junction of wall 31 and the angle of its bottom is formed by the drill bit tip at 32. Thus, a backstop for drill bit 17 is provided to drill angled hole 33 as seen in FIG. 5. Hole 33 is approximately four to five times in length the diameter of angle member 12. The typical finished hole for insertion of anchor 10 is seen in FIG. 6. A sealant or caulking compound may be used to fill the holes 30, 33 in those applications in which anchor 10 is to be exposed to the elements and in order to seal against water entry.

Next the lower end portion of anchor 10 is inserted by hand into hole 30 and then is tilted so that the lower angled portion 12 fits into the angled hole 33 typically with a clearance of, for example, 0.025 inches at point C. After anchor 10 is inserted, as seen in FIG. 7, and nut 39 tightened, the deformed bend 15 firmly contacts the upper wall of angled hole 33. In this way, the stress is removed or reduced and crackling and crumbling of the concrete is eliminated at point 34 or substantially reduced.

Upon completion of the foregoing operations, a shallow, vertical hole 35 is drilled adjacent to and at the heel of anchor 10 as seen in FIG. 8. It has been determined that increased holding power and increased vibration resistance can be obtained by drilling and plugging a shallow, vertical hole 35 of the same diameter adjacent to heel 36 of anchor 10. Hole 35 is easily drilled by using the upper rod portion 11 of anchor 10 as a guide to locate hole 35.

Figure 11:
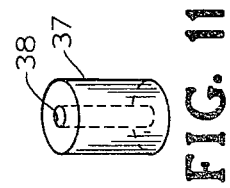
FIG. 11 is a perspective view of the plug used with the preferred embodiment of the invention.

Next, a nylon plug 37, shown in FIG. 11, is inserted in hole 35 as illustrated in FIG. 9. Plug 37 has a longitudinal hole 38 through its center to facilitate removal of plug 37 when anchor 10 is to be removed. Hole 38 also provides an additional resilient character to plug 37 and thereby contributes to increasing vibration resistance. Next, the base 19 to be anchored is put into position and fastened to anchor 10 by washer 39a and nut 39 as illustrated in FIG. 10. As nut 39 is tightened, bend 15 becomes frictionally engaged in the hole and increased frictional engagement between heel 36 and plug 37 is also achieved which tends to further lessen stress at point 34 and thereby prevent crumbling or cracking of the concrete or at least reduce it.

Figure 14:
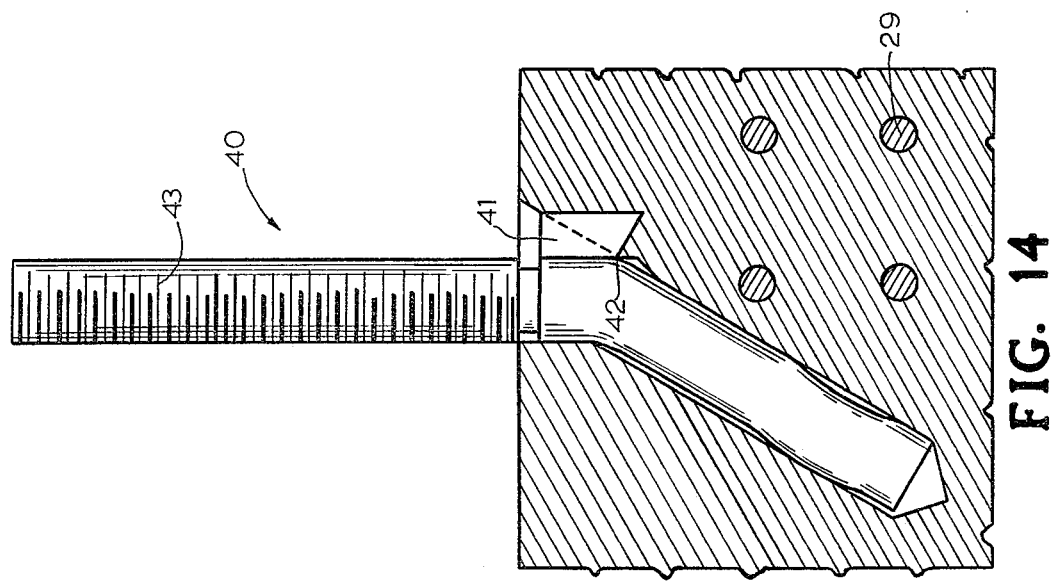
FIG. 14 is a fragmentary section view through a concrete floor slab with the anchor of FIG. 12 installed.
Figure 12:
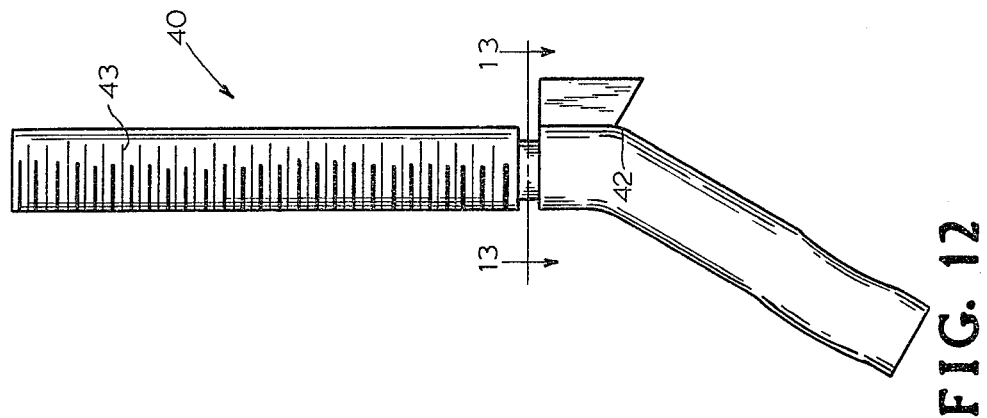
FIG. 12 is a side elevation view of a second embodiment of the anchor invention.
Figure 13:
FIG. 13 is a cross section view taken on line 13—13 of FIG. 12.

As an alternative to plug 37, a short vertical spur 41 is provided integral with a second embodiment anchor 40 as seen in FIGS. 12, 13 and 14. Spur 41 is located adjacent heel 42 of anchor 40. It may be necessary to use a sleeve-type setting tool to facilitate the insertion of spur 41 into hole 30. This tool may be slipped over threaded portion 43 of anchor 40 until it bears upon the uppermost portion of spur 41. Then spur 41 is hammered into place in the concrete slab.

While not illustrated, it is recognized that the various embodiments of the anchor heretofore and hereafter described could be used in a single angled hole drilled in concrete or preformed in the concrete during pouring without drilling a vertical hole prior to drilling the angled hole. However, the previously described two-hole drilling method is preferred.

Figure 15:
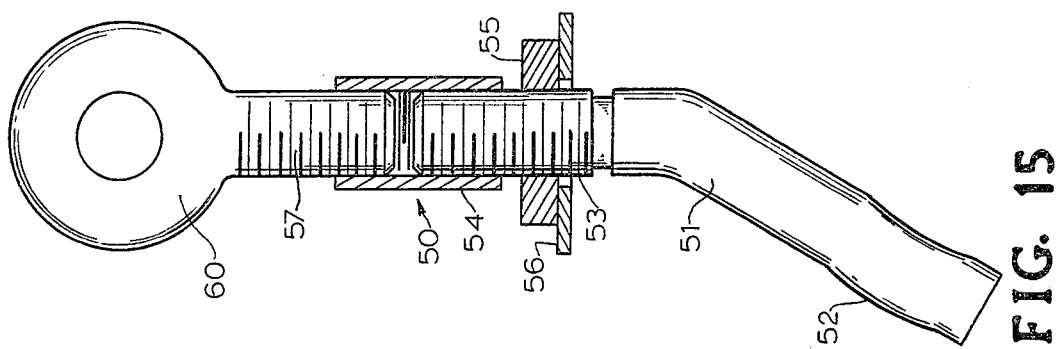
FIG. 15 is a side elevation of a third embodiment of the invention anchor adapted for tie-down and similar purposes.

A third embodiment is illustrated in FIG. 15. Anchor 50 comprises a lower portion 51 having a bend 52 and which is installed in the concrete as in previously described embodiments. A turnbuckle 54 is screwed on a threaded portion 53 mounting nut 55 and washer 56. Turnbuckle 54 may in turn receive any suitably threaded device. For illustration, a threaded shaft 57 is designed to be screwed into the free end of turnbuckle 54 to support an integral ring 60. While a ring has been illustrated, it is possible to have other types of threaded anchor attachments for screwing into turnbuckle 54 such as hooks, threaded rod extensions or the like.

While not illustrated it should be recognized that the anchor of the invention could be formed by bending a threaded rod to the appropriate angle X, cutting a thread relief such as illustrated in the drawings, forming the deformed portion, i.e., bend 15, and installing the appropriate nut or other tightening device. A rod with rolled threads would be well suited for this application. Generally speaking, anchor bolts run in the range of about ¼" to 2½" in diameter and the various embodiments illustrated all adapt to this full range of sizes. Normally, the anchor of the invention would be expected to be made of metal as previously described, however, the suitability of some plastic materials is also recognized. The material is preferably resilient and solid.

In summary, the anchor and method of the invention are believed to represent a simple but significant advance in the art for anchors placed in concrete or any other relatively hard material. The fact that the invention anchor is reusable in itself means that use of the invention will result in significant savings of energy. The very simple installation procedure readily adapts to avoiding reinforcing rods or the like and will result in substantial savings of time on the job. Most important and what is believed to be of unique significance is the fact that by having the lower end of the anchor installed in an angled hole, having the lower end provided with a deformed section, i.e., bend 15, so as to have a stress point or surface offset from the major inner wall surface of the lower end and by having the lower end clamped against a thick web of concrete, stress is relieved from the narrow portion of the web and maximum holding power is achieved. Also of importance is that by use of the plug, e.g., plug 37, against the base of the anchor creeping of the anchor out of its hole under normal loading is substantially prevented. Thus, when plug 37 is employed in the example of FIG. 10, the web of concrete is effectively clamped between the bearing surface 12d (FIG. 1) and the machine base 34, substantial stress is transferred to the bearing surface 12d (FIG. 1) and reduced on the inner wall 12d (FIG. 1) thus eliminating or at least substantially reducing any tendency of the concrete to crumble at point 34 and substantial holding power has proven to be achieved.

What is claimed is:

1. A reusable heavy duty anchor device adapted to be removably secured to a structure formed of concrete or other hard material and having a round anchor receiving hole extending inwardly from and having the axis thereof angled with respect to the plane of an outer surface of the structure, said anchor device comprising:
    (a) an integral rigid rod member formed from solid resilient rod stock of round cross section and having:
        (i) a first anchor section adapted to fit within said hole with a major end portion extending from the entrance into the hole being aligned with an opposite minor end portion at the base of the hole and between the major and minor end portions having an intermediate misaligned portion providing a bearing surface on the inner wall thereof for engaging an opposing internal surface area of said hole and with reduced clearance as compared to the clearance established between the inner surface of said hole and the inner walls of said major and minor end portions; and
        (ii) a second attachment section adapted to extend outwardly from the entrance of said hole when said first anchor section is secured in said hole to serve as an anchoring means on said structure, said second attachment section having a straight body portion, the axis of which is bent at an angle with respect to the axis of said first anchor section major and minor end portions, the extent of said angle being selected such that the axis of said straight body portion of said second attachment section may be oriented at a selected angle relative to the said surface of said structure when said first anchor section is fitted in said hole and when said attachment section is loaded to bring said bearing surface in frictional engagement with the opposing internal surface area of said hole to reduce the stress applied by the inner wall of said major end portion to said structure near the entrance of said hole.

2. An anchor device as claimed in claim 1 wherein said second attachment section is adapted to be oriented perpendicular to the said surface of said structure when said first anchor section is fitted in said hole and including securing means for releasably securing said first anchor section in said hole in a manner enabling the axis of said second attachment section to be maintained perpendicular to the axis of said aligned major and minor end portions of said first anchor section and the web of material adjacent the inner wall of said first anchor section to be effectively clamped by said securing means and first anchor section.

3. An anchor device as claimed in claim 2 wherein said second attachment section is threaded and said securing means comprises threaded securing means adapted to threadably mount on said second attachment section and with said first anchor section installed in said hole being adapted when tightened to draw said bearing surface into tight frictional engagement with the opposed internal wall surface of said hole and the axis of said second attachment section into substantially true perpendicular relation with said structure surface.

4. An anchor device as claimed in claim 3 wherein said angle is within the range of thirty to forty-five degrees.

5. An anchor device as claimed in claim 3 wherein the length of said first anchor section is within the range of four to seven times the diameter of said rod stock.

6. An anchor device as claimed in claim 3 wherein said angle is within the range of thirty to forty-five degrees and the length of said first anchor section is within the range of four to seven times the diamter of said rod stock.

7. An anchor device as claimed in claim 3 wherein said securing means includes a resilient plug adapted to be releasably secured in a vertical hole drilled adjacent to the juncture of said first and second sections.

8. An anchor device as claimed in claim 7 wherein said angle is within the range of thirty to forty-five degrees and the length of said first anchor section is within the range of four to seven times the diameter of said rod stock.

9. An anchor device as claimed in claim 3 wherein said rod stock comprises threaded rod stock and said first and second sections are formed from said threaded rod stock.

10. An anchor device as claimed in claim 2 wherein said securing means comprises a spur-like formation formed on and integral with said rod member adjacent the juncture of said first and second sections and extending outwardly therefrom, said spur member being adapted to be embedded into said structure material to maintain the securement of said anchor device and the perpendicular orientation of said second attachment section with respect to the surface of said structure.

11. An anchor device as claimed in claim 1 wherein said second attachment section is threaded and including means for threadably securing an anchoring ring, hook, or the like, to the threaded portion of said second attachment section.

12. A method of establishing a reusable heavy duty anchor support adapted to be removably secured to a structure formed of concrete or other hard material comprising the steps:
    (a) drilling in the structure a round anchor receiving hole extending inwardly from and having the axis thereof angled with respect to the plane of an outer surface of the structure;
    (b) installing in said hole an anchor device comprising:
        (i) an integral rigid rod member formed from solid resilient rod stock of round cross section and having:
            (aa) a first anchor section adapted to fit within said hole with a major end portion extending from the entrance into the hole being aligned with an opposite minor end portion at the base of the hole and between the major and minor end portions having an intermediate misaligned portion providing a bearing surface on the inner wall thereof for engaging an opposing internal surface area of said hole and with reduced clearance as compared to the clearance established between the inner surface of said hole and the inner walls of said major and minor end portions; and
            (bb) a second attachment section adapted to extend outwardly from the entrance of said hole when said first anchor section is secured in said hole to serve as an anchoring means on said structure, said second attachment section having a straight threaded body portion, the axis of which is bent at an angle with respect to the axis of said first anchor section major and minor end portions, the extent of said angle being selected such that the axis of said straight body portion of said second attachment section may be oriented perpendicular to the said surface of said structure when said first anchor section is fitted in said hole; and
    (c) installing on said second attachment section a nut and tightening said nut to bring said straight body portion into said perpendicular orientation and said bearing surface into tight frictional engagement with the opposing inner hole wall surface and effectively clamp said first anchor section to the web of said material residing between said nut and said bearing surface and on the inner wall side of said first anchor section.

13. The method of claim 12 including the step of drilling a second hole in said structure with the axis thereof perpendicular to the said surface of said structure and located adjacent the entrance of said angled hole and after installing said first anchor section in said angled hole and prior to tightening said nut slidably installing in said second hole a resilient plug member arranged to engage the outer base wall surface of said second attachment section straight body portion and increase the holding force of said first anchor section.

* * * * *